Dec. 5, 1950 L. A. DAILEY ET AL 2,532,540
AUTOMATIC BILLET STAMPER
Filed March 7, 1947 6 Sheets-Sheet 1

Inventors:
LAWRENCE A. DAILEY and
ERNEST A. ERICKSON,
by: Donald G. Dalton
their Attorney

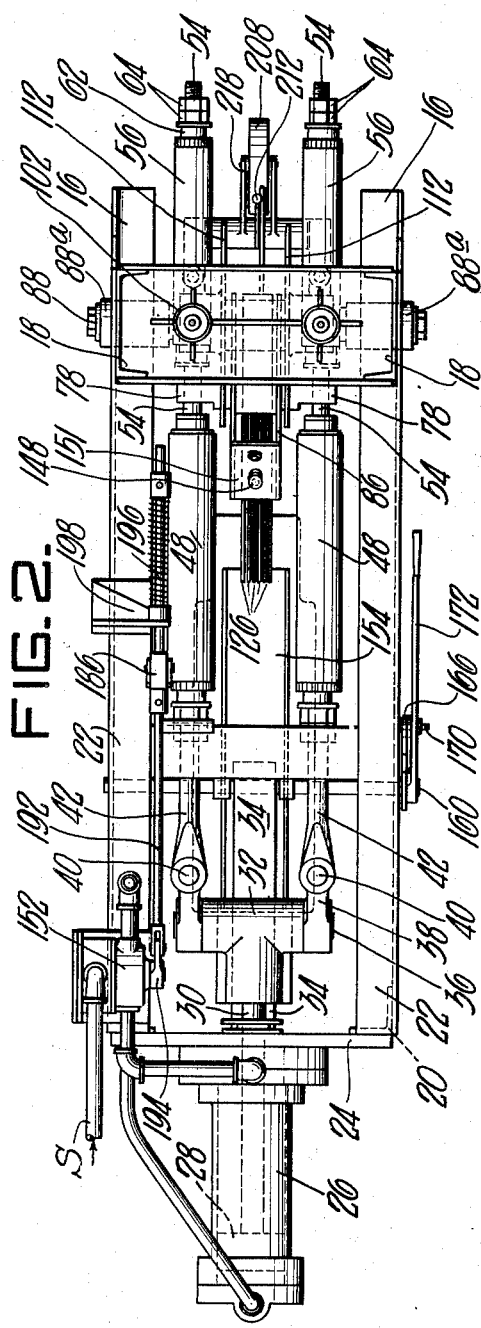

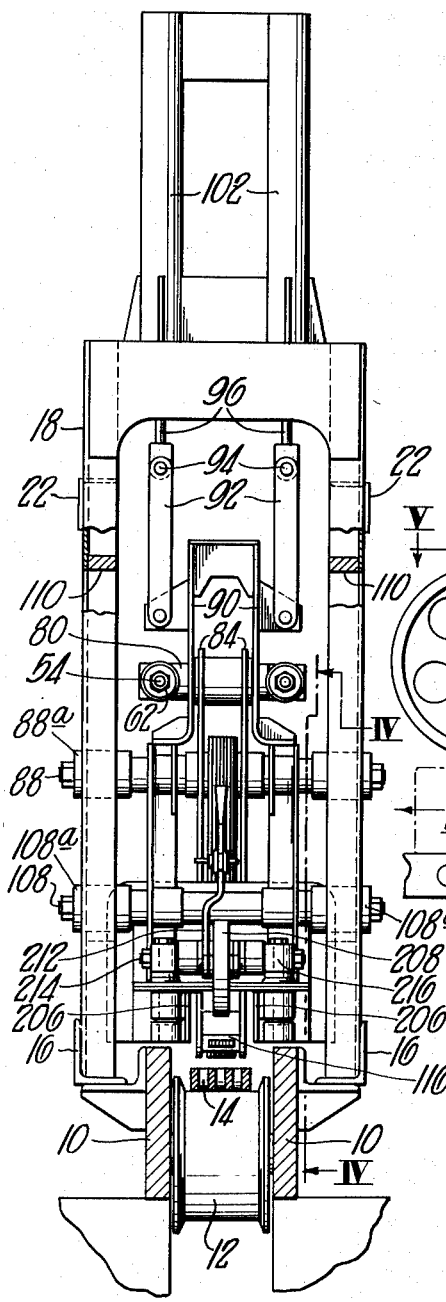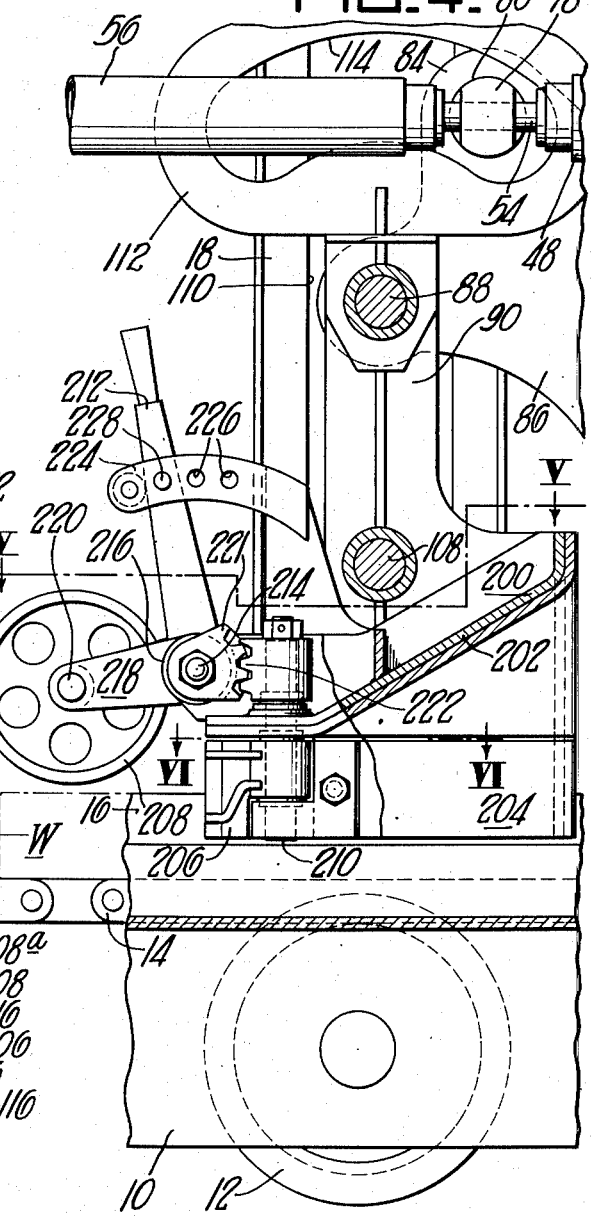

Dec. 5, 1950 L. A. DAILEY ET AL 2,532,540
AUTOMATIC BILLET STAMPER
Filed March 7, 1947 6 Sheets-Sheet 4
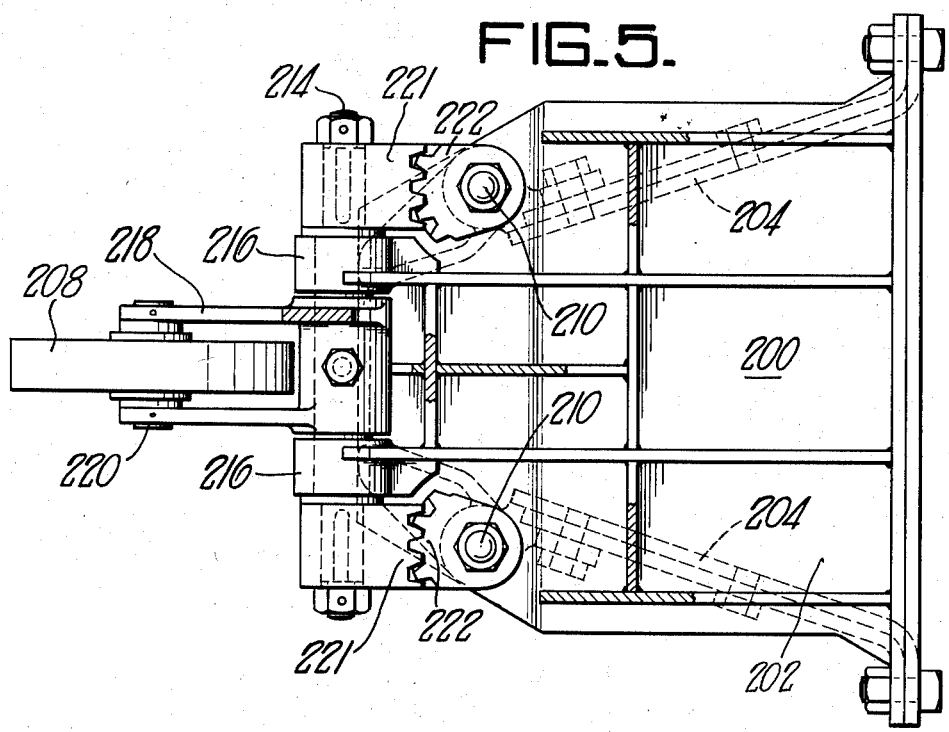
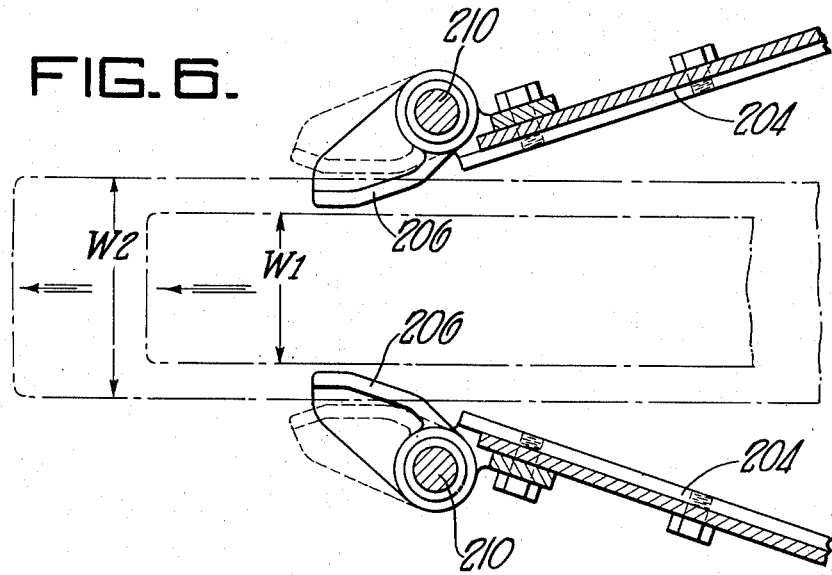
Inventors:
LAWRENCE A. DAILEY and
ERNEST A. ERICKSON,
by: Donald G. Dalton
their Attorney.

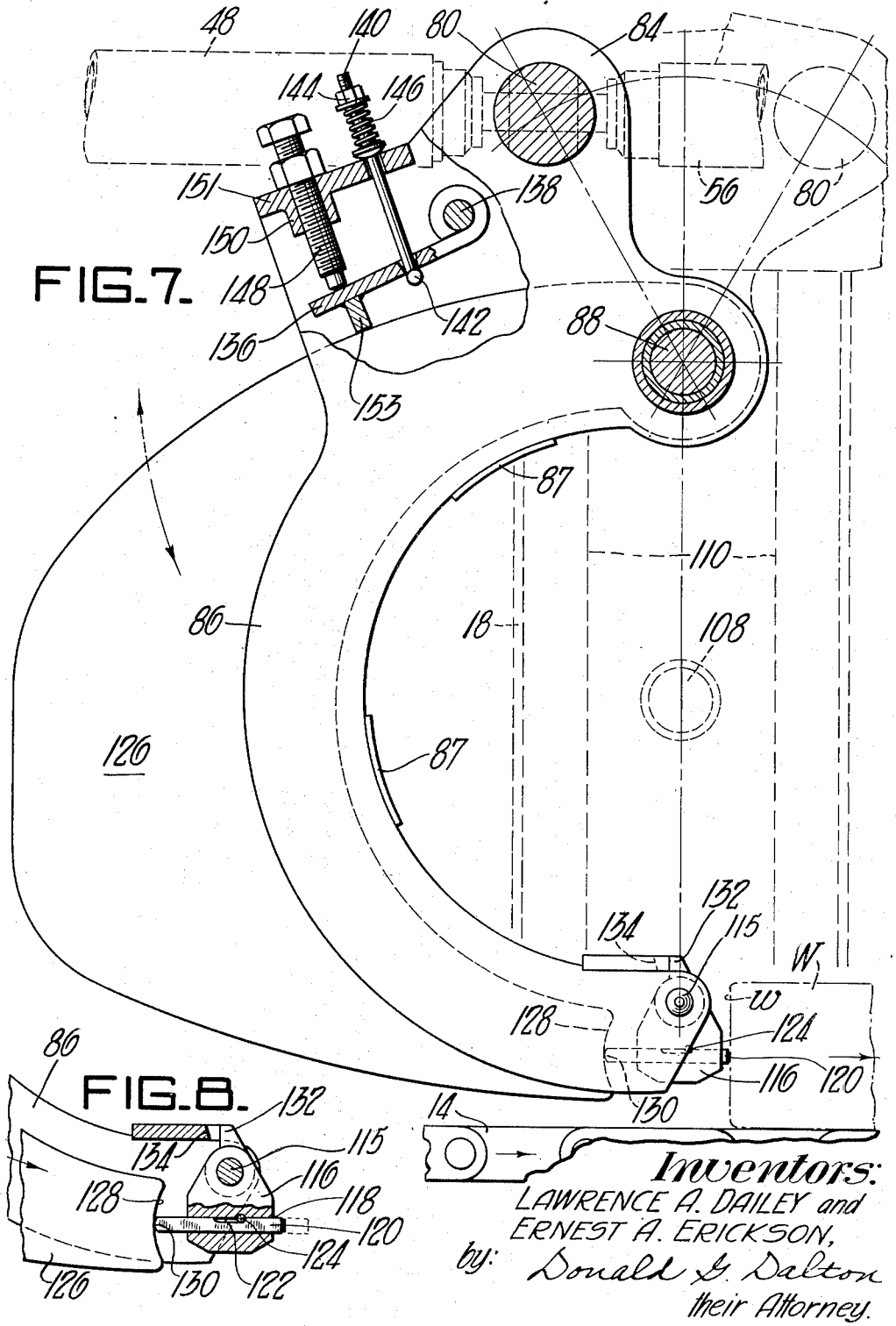

Dec. 5, 1950     L. A. DAILEY ET AL     2,532,540
AUTOMATIC BILLET STAMPER
Filed March 7, 1947     6 Sheets-Sheet 6
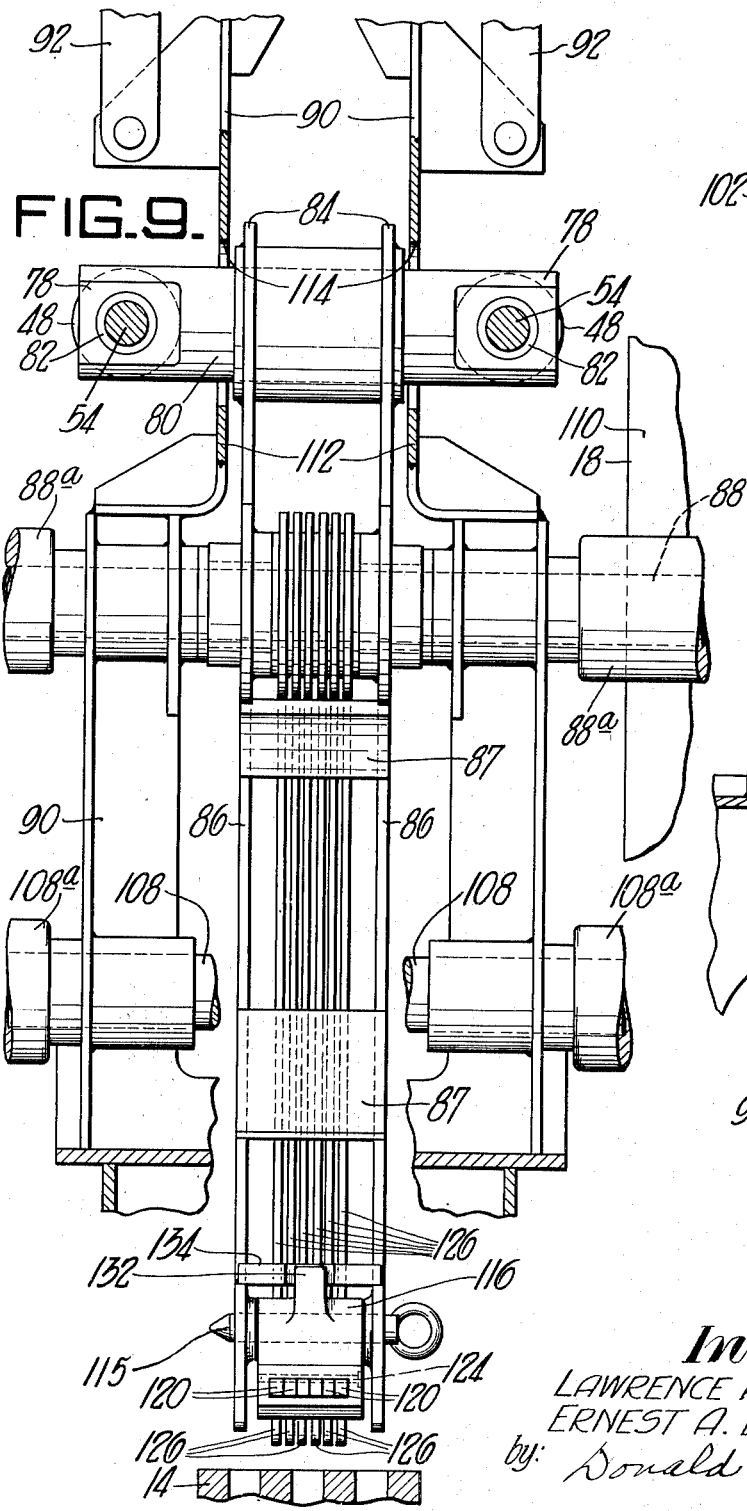
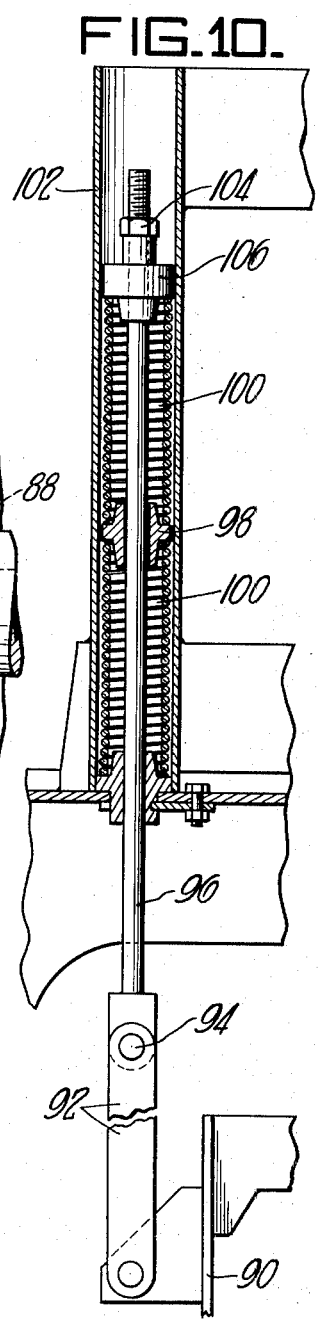
Inventors:
LAWRENCE A. DAILEY and
ERNEST A. ERICKSON,
by: Donald G. Dalton
their Attorney.

Patented Dec. 5, 1950

2,532,540

UNITED STATES PATENT OFFICE 2,532,540

AUTOMATIC BILLET STAMPER

Lawrence A. Dailey, Elizabeth, and Ernest A. Erickson, Clairton, Pa.

Application March 7, 1947, Serial No. 733,240

11 Claims. (Cl. 101—4)

The present invention relates to an automatic billet stamper adapted to forcibly and unfailingly imprint in the upright end faces of billets suitable identifying numbers or characters regardless of irregularities in said end faces or the angular dispositions thereof.

One object of the invention is to provide power actuated means effective to stamp a group of identifying characters on the respective rear end face of bars, billets or similar objects while they are being fed lengthwise by a travelling conveyor without interrupting the travel or materially effecting the speed of billet travel to any material extent.

A further object of the invention is to provide a multi-hammer arrangement comprising individual hammer elements for each stamp or type face so that each stamp will continue in motion until stopped by penetration thereof into the end surface of the billet being marked.

A further object is to provide means to compensate for variations of the angular disposition of the end faces of bars or billets to be stamped.

Another object is to provide a stamp holder which is pivotally secured to a swingable carrier so as to permit the stamp holder to adjust itself until square contact is made between the working face of the stamp and the end face of the billet.

Another object is to provide a floatingly supported billet guide so related to the stamping mechanism that the guide will follow upward and lateral irregularities of the passing slightly crooked billet for the purpose of centering the rear end area of the billet in proper relation to the stamp holder at the time the imprinting blow is applied.

A further object is to construct the various instrumentalities, hereinafter described in detail, so that they individually and collectively perform the individual and cooperating functions herein set forth.

For a more complete and comprehensive understanding of the novel features of our improvements reference should be made to the following detailed description, the accompanying drawings and the appended claims.

In the drawings:

Figure 2 is a plan view of the apparatus;

Figure 3 is an end elevation of the work-exit end of the apparatus, viewed from the right side of Figure 1;

Figure 4 is an enlarged fragmentary vertical longitudinal section taken on line IV—IV of Figure 3;

Figure 5 is an enlarged fragmentary horizontal section taken on line V—V of Figure 4;

Figure 6 is a similar horizontal section in a plane below Figure 5 as indicated by section line VI—VI of Figure 4;

Figure 7 is an enlarged detail view of a portion of the floating stamping unit and illustrating the common pivotal mounting for the stamp carrier and the multi-hammers for striking individual blows to the individual stamps;

Figure 8 is a detail view of the stamp holder showing its pivotal mounting on the free end of the swingable carrier and illustrating the action of the concaved end edge of one of the multi-hammers coacting with the convex end face of one of the stamps;

Figure 9 is an end elevation of a portion of the floating stamping unit as viewed from the right of Figures 1 and 7; and Figure 10 is a detail view of the suspension means for the floating stamping unit showing the hanger links and the shock absorbing supporting means therefore.

Figure 11 is an enlarged detail view, partly in longitudinal section, of one of the pair of connecting rods used for transmitting motion from the piston rod to rock the pivotally mounted stamp carrier.

Figure 1:
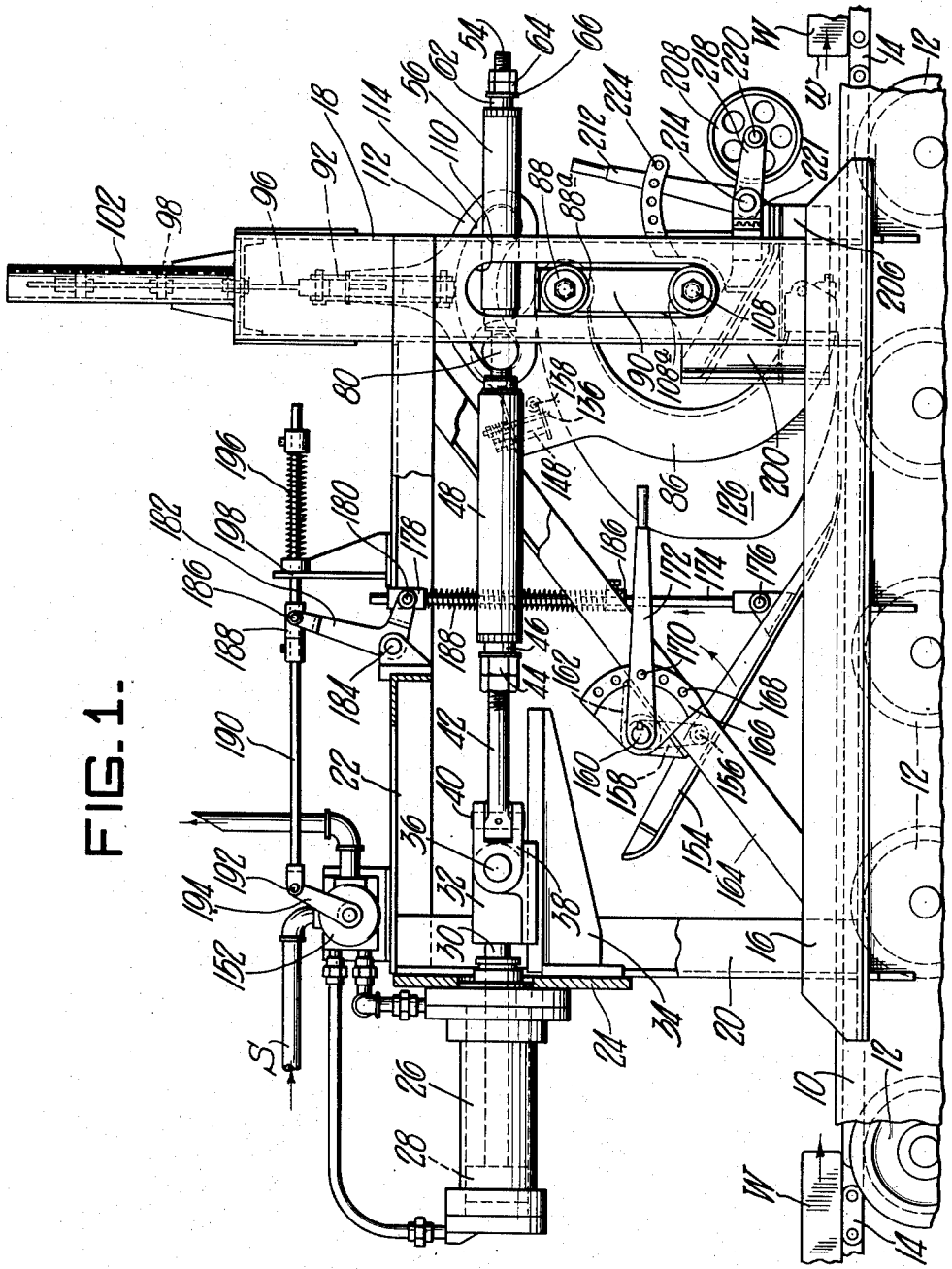
Figure 1 is a side elevation of a preferred form of apparatus embodying the invention.

Referring in detail to the drawings 10—10 represents fixed side rails of a conventional form of conveyor, including flanged rollers 12 journalled in the side rails and supporting the upper run of travelling conveyor chains 14 which are adapted to propel billets or other workpieces, such as indicated at W, in the direction of the arrows in Figure 1.

The chief purpose of the herein described apparatus is to apply an identifying heat number on the trailing end face w of a billet or other workpiece W and to unfailingly imprint the heat numbers on such trailing end face regardless of irregularities in the end surface or regardless of the angular disposition of the end face due to inaccuracies in shearing the billet or due to warping of the same due to rolling or variations of temperature.

The apparatus illustrated includes a stationary framework consisting of lower angle bars 16 fixedly secured to the side rails 10 of the fixed conveyor frame. Rising from each of the side bars 16 there are fixed front uprights 18 and rear uprights 20. Spanning the space between the uprights 18 and 20 there are secured upper side bars 22.

Bridging the space between rear uprights 20 there is a tranverse plate 24 to which is secured a cylinder 26 containing a piston 28 for reciprocating a rod 30 which in turn reciprocates a crosshead 32 travelling on a guide 34 secured to the plate 24.

A pin 36 in the crosshead 32 is connected with universal joints 38 which in turn are connected by pins 40 with connecting rods 42 which carry adjusting nuts 44 for coaction with sleeve members 46, best shown in Figure 11, working in shock absorber casings 48 which contain compression springs 50. The springs 50 react against a collar 52 loose on the rod 42 and bearing against the sleeve 46. A reduced portion 54 of each rod 42 is surrounded by a casing 56 enclosing a shock absorbing spring 58, this spring reacting against a collar 60 and a sleeve 62 which reacts against adjusting nuts 64 to permit varying the cushioning action of the spring. The nuts 62 bear against washers 66 which engage the sleeve 62 whose inner end abuts the collar 60 freely slidable on the rod extension 54.

The casings 48 and 56 carry upstanding lugs 70 and 72 which receive the opposite ends of a rod 74 surrounded by a compression spring 76. One end of the rod 74 may be pinned to lug 72 and the opposite end may slide freely in the lug 70 so as to keep the parts yieldingly centered. The reduced portions 54 of the parallel connecting rods 42 penetrate the opposite extremities 78 of a crank pin 80, said rods passing through sleeves 82 secured to the crank pin by suitable set screws, as shown in Figure 11. The crank pin 80, as best shown in Figures 4 and 7, is mounted in a crank extension arm 84 of a curved stamp carrier 86, which in turn is mounted for swinging movement about the axis of a shaft 88 supported by floating guide frame members 90, which are suspended from links 92 (Figures 3 and 10) whose upper ends are connected by pins 94 with rods 96 each carrying a collar 98 for coaction with shock absorbing springs 100 contained in casings 102 secured to a fixed part of the frame structure, as shown in Figure 10. Near its upper extremity each rod 96 has threaded thereon a nut 104 for adjusting a member 106 which bears against the upper spring 100. The structure as thus arranged provides a floating support which will permit limited floating movement of the floating stamping unit both up and down and in a direction transverse to the line of travel of the billet. Such floating stamping unit properly coordinates the mechanism with that of billet engaging guides later described which in turn operatively coact to insure centering the stamps with the central region of the end face of the billet.

Spaced below the shaft 88 and also mounted in the floating frame 90 there is a second shaft 108. The shafts 88 and 108 carry respective rollers 88a and 108a which are guided in respective vertical slots 110 (Figures 1, 4 and 9) formed in the fixed upright members 18.

The floating frame 90 has fixedly secured thereto plates 112 (Figures 4 and 9) formed with arcuate slots 114 therein through which extend the outer extremities of the crank pins 80, which pins, it will be remembered, are provided with the sleeves 82 (Figure 11) which are pierced by the rod extensions 54 of the connecting rods 42 which in turn are connected through the universal joints 38 with the crosshead 32 reciprocated by the piston 28. As thus arranged, it will be apparent that when air is admitted to the left end of the cylinder 26 (Figure 1) that piston 28 acting through the rods 42 will swing the crank pin 80 from the full line position of Figure 7 to the dotted line position shown, thus rocking the stamp carrier 86 about the axis of shaft 88.

Near its lower extremity the stamp carrier 86 has a pin 115 secured therein forming a pivotal mounting for a stamp holder 116 having a guide slot 118 cut therein for slidably supporting a plurality of stamps 120 in a manner to permit them to move independently of one another. Each stamp is provided with a cut-out recess 122, best shown in Figure 8, for coaction with a removable keeper pin 124 which is adapted to facilitate the insertion and removal of individual stamps so as to change the identifying numerals to correspond to different heats of steel from which the billets or other workpieces W are produced, it being remembered that the apparatus of this invention is designedly intended for impressing identifying characteristics on the end faces of billets or similar metal workpieces.

In the embodiment of the invention illustrated there are, as best shown in Figure 9, six individual stamps 120, although this number, of course, can be varied to suit requirements. Coacting with each individual stamp 120 there is an individual multi-hammer 126. Therefore, in the embodiment shown, there are six such multi-hammers. They are pivotally supported for swinging movement about the axis of the shaft 88. The edges of the lower extremities of the hammers are provided with convex striker portions 128 for coaction with the rounded extremities 130 of the stamps 120. To prevent overturning of the stamp holder the same is provided with a lug 132 adapted to coact with an abutment 134 fixed to the stamp carrier 86. Adjacent the crank portion of the stamp carrier I provide an adjustable plate 136, best shown in Figure 7, pivoted on a pin 138 and normally pulled upwardly by a rod 140 extending through an aperture in plate 136 and having a head 142 engaging the under side of plate 136. At its upper end the rod 140 carries an adjusting nut 144 against which a spring 146 reacts. Thus the spring tends to rock the plate 136 upwardly. The upward movement of the plate is limited by an adjustable stop screw 148 threaded in a boss 150 extending from transverse web 151 forming part of the stamp carrier 86. Secured to the plate 136 there is a bar 153 which bears on all of the hammers 126.

The supply of motive fluid, such as compressed air or the like, to the cylinder 26 is under control of a four-way valve 152 (Figure 1) which is arranged to be automatically actuated by the oncoming billet or other workpiece W moving in the direction of the arrows in Figure 1. To effect automatic control of the valve and as a result to cause the automatic actuation of the stamping mechanism, I provide a slipper 154 which is pivoted to a pin 156 secured to the extremity of a lever 158 carried by a shaft 160 mounted in a bracket 162 secured to a fixed strut 164 forming part of the framework of the apparatus. A fixed locking plate 166 is provided with a plurality of holes 168 for coaction with a locking pin 170 passing through a suitable aperture in a manually operable adjusting lever 172, by means of which the elevation of the slipper 154 may be adjusted so as to set the same for coaction with billets or workpieces of different heights.

When an oncoming billet or workpiece W strikes the lower extremity of the slipper 154, it is adapted to rock the same about its pivot 156. This rocking motion is transmitted to a rod 174 which is pin-connected at 176 to a suitable lug on the slipper, the other end of this rod carrying a collar 178 having a pin connection 180 with a bell crank 182 pivoted at 184 to a fixed bracket secured to an upper transverse frame member. The rod 174 carries a lower collar 186 and there is a spring 188 interposed between the collars 186 and 178 so as to cushion the action of the oncoming billet. The bell crank 182 is pin-connected at 186 with a collar 188 secured to a rod 190 which is connected by a pin 192 to a lever 194 adapted to operate the four-way valve 152 previously referred to. The leading end of the billet W will, through the connections described, rock the valve operating lever 194 in counter-clockwise direction, as shown in Figure 1, thereby compressing a spring 196 against a boss of a guide bracket 198 through which the rod 190 extends. After the billet has passed beyond the slipper 154, the previously compressed spring 196 will return the parts to the position shown in Figure 1.

As the leading end of the billet W approaches the stamping mechanism, the stamp carrier 86 and the multi-hammers 126, previously referred to, will have been rotated upwardly about the axis of shaft 88.

The floating guide frame 90 at its lower portion, (Figures 1, 4, 5 and 6) includes a bell-mouthed guide, indicated as a whole at 200. This guide includes a downwardly inclined top portion 202, best shown at Figure 4, and converging side portions 204, best shown in Figures 5 and 6. The function of this bell-mouthed guide is to insure that the floating stamp mechanism as a whole is properly lined up with the end of the billet on which the stamps are to impress the identifying characteristics or to approximately center the stamped heat number in the central region of the trailing upright end face of the billet. In this connection it is to be understood that it is desirable that the apparatus shall be readily adjusted to suit billets of different widths. For this reason I provide the adjustable side guides 206, best shown in Figures 5 and 6, and the top guide roller 208, best shown in Figures 3 and 4. The side guides are carried by upright shafts 210 and said guides 206 in effect constitute movable extensions of the converging walls 204 of the bell-mouthed guide as will be apparent from Figure 6. The guides 206 are adapted to be shifted from the full line position of Figure 6 where they are shown in proper adjustment for the billet W—1 of minimum width or to the dotted position where they are adjusted for properly guiding billets of the maximum width indicated at W—2. For simultaneously adjusting both side members 206 and the top guide roller 208 I provide a hand lever 212 (Figure 4) secured to a rock shaft 214 mounted in suitable bearings 216. This shaft has secured about midway of its ends the hub of a lever 218 which carries a stub shaft 220 on which the top guide roller 208 is journalled. Near its ends the shaft 210 carries spiral gears 221 which mesh with similar gears 222 secured to the upper extremities of the shafts 210 on which side guides 206 are mounted. A locking plate 224 is provided with a plurality of apertures 226, any one of which is adapted to coact with a locking pin 228 engaging a suitable aperture in the adjusting lever 212. Thus, by inserting the pin 228 in the appropriate aperture 226 the side guides 206 and the top guide 208 may be simultaneously set to properly guide the billets in a path centered with respect to the center line of the group of stamps carried by the stamp holder 116.

In the operation of the stamping apparatus constructed and arranged as above described, it will be apparent that as the billet W travels in the direction of the arrows in Figure 1, the leading end of the billet will rock the slipper 154 about its pivotal support 156, thus transmitting motion through the rod 174 and bell crank 182 to the valve-operating lever 194, thereby admitting compressed air through the supply pipes shown in Figure 1 to the left end of the cylinder 26. This will cause piston 28 to shift the crosshead 32 thus transmitting motion through the connecting rods 42 to the crank pin 80 thereby rocking the stamp carrier 86 upwardly about the axis of shaft 88. During this upward motion plates 87 carried by the member 86 will contact the freely pivoted multi-hammer elements 126 and thus raise them until they engage the aligning bar 153. As the trailing end of the traveling billet W passes beyond the slipper 154, the same will drop approximately to the position of Figure 1, thus shifting the operating lever 158 of the four-way valve to the position of Figure 1 thereby shifting the crosshead 32 to the left, thus quickly rocking the stamp carrier to the position of Figure 1 whereupon the freely hung multi-hammers due to the inertia of the moving parts each strike an individual forcible blow to each individual stamp 120 thereby causing the type face of each stamp to penetrate into the surface of the trailing upright end face of the billet to a uniform extent in spite of the fact that the end face may not be truly perpendicular to the line of travel of the billet. This desirable result is attainable by the use of the multi-hammers 126 striking the individual stamps which are relatively moveable with respect to one another in the stamp holder 116. It will also be apparent that because of the bell-mouthed formation of the member 204 and the provision of the adjustable side guides 206 and the top guide 208 that the parts may be adjusted to accurately line up the stamps for the proper centering of the identifying numbers on the end faces of billets of varying widths, this adjustment being secured by a manipulation of the adjusting lever 212. The adjustment of the slipper 154 to suit various heights of billets or other work to be stamped will be effected by manipulation of the hand lever 172 and the securing of the same in the desired position by engaging the locking pin 170 with appropriate hole 168 of the plate 166. It is to be noted that the pivotal mounting 115 of the stamp holder 116 will permit the holder to swing back and forth until proper contact is made by the stamps with any angular end face which may deviate from a true vertical plane, thus compensating for variations in the angular disposition of the trailing end face of the billet to be stamped. In other words, when the stamps come in contact with the work to be marked, the holder will rock and adjust itself so that the line of motion of the stamps will be approximately truly perpendicular to the face of the billet to be marked. In this connection it is also to be noted that the concave face 128 of each multi-hammer is such that even though there is considerable rocking motion of the stamp holder 116 about its pivot pin 115, the multi-hammers will strike square blows on the rounded rear faces 130 of all the individual stamps (Figure 8). The floating supports for the bar guide combined with the stamping mechanism shown and described provides a combination of parts which will follow up and down as well as the sidewise movements of the passing billet, which results in properly centering the rear end area of the billet with respect to the location of the group of marking stamps carried by the stamp holder at the instant the impact is applied to the stamps by the multi-hammers.

The capacity and free length of the balancing springs shown in Figure 11 are determined by the load to be carried and from the maximum lift which the hammer unit will eventually receive from a billet with badly bent ends. To cut down the resistance and uplift, the springs of Figure 11 should balance the full load at the point of the extreme position of the stamping unit and the billet guides. This proportioning of the balance has the definite purpose of retaining sufficient balancing power at the end of the stamping mechanism, yet not to balance the whole load thereof in order to secure a swift return speed of the stamping mechanism on the way down. While the compressed air or other motor fluid has been shown as most suitable for powering the stamping mechanism illustrated, other drive means such as electric motor thrusters or solenoids can be employed if desired.

The hinged or pivotally mounted plate 129, described principally in connection Figure 7, provides means for universal adjustment of the lagging motion of the multi-hammer laminations. A lagging motion at the down stroke is considered desirable since it more readily permits the stamping head and stamps to adjust themselves to the proper position with relation to the end face of the billet before the final blow from the hammers is applied.

The notched arrangement of the individual stamp shown in Figure 8 held in place by the keeper pin 124 is desirable because it facilitates the changing of stamps to suit different heat numbers or other identifications. At the time of such change, it is merely necessary to withdraw the keeper pin 124 laterally to the right as in Figure 9, and to free one or more of the stamps 129, whereupon new stamps can be substituted and the keeper pin replaced to the position in Figures 8 and 9. This pin 124 will preferably have a few threads at its end so as to prevent the same from being displaced by the motion of the stamping unit as a whole, but when stamps are to be changed or replaced, the pin can be readily removed by giving the same a few turns and then pulling it to the right in Figure 9.

The stamping unit described may be said to be a full-floating sub-assembly since the overhead links and related parts from which it is suspended permit it to shift laterally so as to take care of crooked billets; as viewed in plan, it being apparent that due to the fact that the bell-mouth guide and the side guides 266, associated therewith, contacting the side faces of the billet, as viewed in plan, will shift the sub-assembly of the stamp instrumentalities laterally at this time rocking the sub-assembly about the links 92. Since these links are suspended from the rods 96 which are connected through the shock absorbing springs 100, it is apparent that if the billet is crooked, as viewed in side elevation, or in other words, has upwardly warped or inclined portions, the stamping unit as a whole will be free to move upwardly so as to take care of such billet irregularities. Because of the full floating characteristics of the sub-assemblage constituting the floating stamping unit, it is advantageous to transmit motion from the power means 26, or its equivalent, to the crank pin 90 through the agency of universally swiveling connections with the crosshead which is guided in a straight line by the rigidly supported guide 34. Thus it is apparent that the disclosed combination and arrangement of parts solves the problem of taking care of irregularities in the billet, such as crookedness as viewed either in top plan or in side elevation. Regardless of such crookedness at the time of the impact of the stamps, the latter will be so positioned that the identifying imprint constituting several letters or figures will be quite accurately centered on the upright end face of the billet and a firm square blow will be imparted to each stamp by the individual hammers, thus unfailingly causing all the stamps to make imprints to substantially the same depth, regardless of irregularities of the end face of the billet or variations in the angular disposition of the end area of the end face.

Although we have described a preferred construction and arrangement of cooperating parts which are believed to effectively solve the problem of effectively and unfailingly impressing identifying characteristics in the ends of either rough irregular square or non-square ended billets, it is to be understood that the drawings and descriptive matter are to be interpreted in an illustrative rather than a limiting sense and that various modifications and substitutions of equivalents may be made by those skilled in the art without departure from the invention as defined in the appended claims.

We claim:

1. An apparatus for impressing identifying characters to an upright end face of a billet, comprising a conveyor for moving the billet endwise, a floatingly mounted unit carrying stamps adapted to impress identifying characters in the end face of a billet on said conveyor, hammer means mounted on said unit for actuating said stamps, guiding means forming part of said unit for centering said unit relative to the free end of said billet, said guiding means including a bell-mouthed member and laterally adjustable billet engaging members, means for simultaneously shifting the latter to suit billets of different sizes so that the stamps will be properly centered with the end face of the billet, and means for moving said guiding means either upwardly or laterally in accordance with the height and width of the billet.

2. The apparatus of claim 1 in which said guiding means includes a bell mouthed member and laterally adjustable billet engaging members adapted to coact with the upright side faces of the billet, and a member adapted to coact with the top face of the billet, and means for simultaneously shifting all three of said guiding members to suit billets of different sizes so that the stamps will be properly centered with the end face of the billet.

3. The apparatus of claim 1 in which said guiding means comprises respective pivotally mounted guide members positioned for engagement with the opposite upright side faces and the top face of the billet and a common operating member and connection for shifting all said guide members.

4. The apparatus of claim 1 in which said guiding means comprises a pair of spaced apart upright flange guide members, each of said flange members being pivotally mounted on an upright shaft, said flange members being adapted to engage the opposite upright faces of the billet, a guide wheel member rotatably mounted on a shaft positioned at right angles to and spaced from the shafts bearing said flange members, the common operating lever secured to a shaft which carries said guide wheel member, gearing connecting said last named shaft with said flange members, and means for locking said operating lever in different positions to set the flange guide members and the wheel guide member for coaction with different sizes of billets.

5. An apparatus of the class described comprising a conveyor, a unit carrying stamps adapted to impress identifying characters in the end face of a billet on said conveyor, means for supporting said unit with freedom for vertical and horizontal movement, guiding means forming part of said unit for centering said unit relative to the free end of said billet, means for moving said guiding means either upwardly or laterally in accordance with the height and width of the billet, said unit including a pivotally mounted stamp carrier and pivotally mounted stamp actuating hammers, power means including a fluid actuated piston for actuating said carrier and hammers, a valve controlling the movements of said piston, and a movably mounted member actuated by a billet being propelled by the conveyor effective to actuate said valve.

6. An apparatus of the character described comprising a conveyor, a unit carrying stamps adapted to impress identifying characters in the end face of a billet, means for supporting said unit with freedom for either vertical or lateral horizontal movement, guiding means forming part of said unit for centering said unit relative to the free end of said billet, means for moving said guiding means either upwardly or laterally in accordance with the height and width of the billet, said unit including a pivotally mounted stamp carrier and pivotally mounted stamp actuating hammers, power means for actuating said carrier and hammers, said power means including a fluid actuated piston, a valve controlling the movements of said piston, a slipper hung from a pivotal support, means for locking said latter in various positions of vertical adjustment to suit different sizes of billets, and connections between said slipper and said valve for actuating the latter each time a billet propelled by the conveyor engages the slipper.

7. A billet marking apparatus comprising means for propelling a billet endwise, a fixed framework including a vertically slotted member, a stamping unit including a floating guide frame suspended from overhead links having a shock absorbing means interposed between them and said fixed framework, said guide frame carrying vertically spaced shafts having thereon rollers which are guided in the slots of said slotted member, a stamp carrier and a plurality of hammers pivotally hung from one of said spaced shafts, a crank portion on said carrier having a crank pin, power means operatively connected with said crank pin for rocking said stamp carrier about the axis of the one of said shafts from which said carrier is hung, a stamp holder pivotally supported adjacent the free end of said carrier and carrying a plurality of stamps arranged to be actuated by said hammers, billet engaging guide means carried by said floating guide frame, and means for shifting the position of the floating guide frame to thus locate the stamps for proper coaction with central region of the end face of a travelling billet regardless of crookedness thereof.

8. The apparatus of claim 7 wherein said guide means are adjustable and connected to means for locking them in different positions for coaction with different sizes of billets.

9. A billet marking apparatus of the character described, comprising a pivotally mounted stamp carrier having a holder pivoted adjacent the free end thereof carrying a plurality of stamps which are slidably mounted therein, coacting stop means on the carrier and holder preventing overturning of the latter, and a plurality of hammers mounted for independent swinging movement about a common pivotal member, each hammer being arranged to strike an individual blow to one of said stamps so as to insure that they all make an imprint of substantially the same depth in the end face of the billet regardless of irregularities present in said end face.

10. A billet marking apparatus of the character described, comprising a pivotally mounted stamp carrier having a holder pivoted adjacent the free end thereof carrying a plurality of stamps which are slidably mounted therein, stop means preventing overturning of said holder, a plurality of hammers mounted for independent swinging movement about a common pivotal member, each hammer being arranged to strike an individual blow to one of said stamps, the edge face at free end of each of said hammers being concaved, and the inner end of each stamp having a convex portion for coaction with the concave edged face of one of said hammers so that each of the latter will impart a substantially square blow to each stamp regardless of the angular position to which said holder may turn about its pivoted connection to said carrier due to the variations of angular disposition of the end face of the billet acted upon by said stamps.

11. In a billet marking apparatus, an overhead fixed support, cushioning means reacting thereon, linkage connected to said cushioning means, a floating guide frame suspended from said linkage, a stamp carrier and a plurality of hammers pivotally mounted on a common shaft carried by said frame, said hammers being adapted to actuate the stamps in said stamp carrier, means guiding said frame in its substantially vertical movements, a bell-mouthed guide forming part of said frame having walls converging in the direction of travel of the billets to be marked, pivoted side guides at the exit end of said bell-mouthed guide, a billet engaging roller adjustably mounted on a top portion of said bell-mouthed guide, and means for simultaneously shifting said pivoted guides and said roller so as to position them for proper coaction with billets of different sizes to be marked.

LAWRENCE A. DAILEY.
ERNEST A. ERICKSON.

REFERENCES CITED

The following references are of record in the file of this patent:

UNITED STATES PATENTS

| Number | Name | Date |
|---|---|---|
| 443,119 | Slick | Dec. 23, 1890 |
| 1,042,210 | Ferriss | Oct. 22, 1912 |
| 1,288,082 | McDonough | Dec. 17, 1918 |
| 1,548,954 | Pasinski | Aug. 11, 1925 |
| 1,599,461 | Dinkelman | Sept. 14, 1926 |
| 1,978,898 | Ford | Oct. 30, 1934 |
| 2,290,827 | Thomas | July 21, 1942 |
| 2,348,566 | Papazian | May 9, 1944 |
| 2,418,165 | Dietrich | Apr. 1, 1947 |
| 2,418,213 | Winterkamp | Apr. 1, 1947 |
| 2,503,504 | Meyer | Apr. 11, 1950 |